June 11, 1935.  K. BEER ET AL  2,004,647
ELECTRIC CONDENSER
Filed Jan. 26, 1932
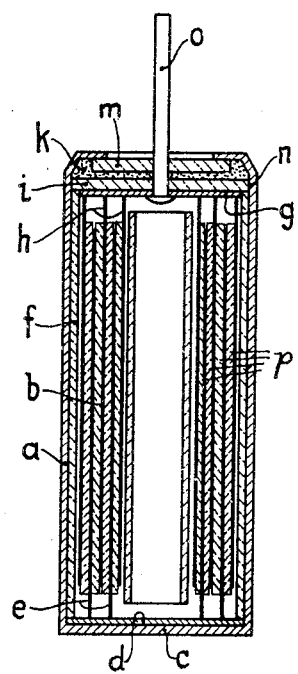
Inventors
Karl Beer
Gustav Pfrommer
by Steward + McKay
their attorneys Patented June 11, 1935

2,004,647

UNITED STATES PATENT OFFICE 2,004,647

ELECTRIC CONDENSER

Karl Beer, Stuttgart, and Gustav Pfrommer, Obertuerkheim, Germany, assignors to Robert Bosch Aktiengesellschaft, Stuttgart, Germany Application January 26, 1932, Serial No. 589,020
In Germany January 28, 1931

7 Claims. (Cl. 175—41)

The present invention relates to electric condensers and more particularly to the sealing or packing of electrical condensers which are enclosed in a metal casing. It is already known, for example, to insert wound condensers in metal cases, and to close them by lids or covers of insulating material, which are held by flanging the upper edge of the metal casing and are pressed against the wound condenser. The leads to the condenser are, in this case, carried through this lid or cover. The joints between the cover and the wall of the casing and the lead are filled with a plastic material. It has been found, however, that this kind of sealing becomes defective when great variations of temperature occur due to the movement of the materials. This drawback is avoided, according to the invention, in that the plastic mass for sealing lies between two discs of insulating material which are held by the inwardly bent edge of the wall of the casing.

An example of construction of the invention is illustrated in the accompanying drawing in which a condenser embodying the invention is shown in longitudinal section.

The casing $a$ of the wound condenser $b$ is a cylindrical vessel, which is open at one end. On the bottom $c$ of the vessel is a springy disc $d$, which is connected in a conducting manner with the metallic foil $e$ of the condenser and to the bottom $c$. The side wall of the vessel is covered with an insulating layer $f$. On the side of the condenser corresponding to the bottom $c$ of the vessel is placed a second springy disc $g$, which is connected in a conducting manner with the other metallic foil $h$ of the condenser and is insulated by the insulating layer $f$ against the casing. The layers of metallic foil $e$ and $h$ are separated by layers $p$ of insulating material. On the springy disc $g$ is placed a disc $i$ of insulating material which snugly fits in the vessel.

A layer $k$ of thermo-plastic material, e. g. asphalt, is then applied and after this a second disc $m$ of insulating material which is of smaller diameter than the disc $i$. The lead $o$ of the condenser is secured to the springy disc $g$, and is carried through the two insulating discs.

The assembling of the condenser is done in the following way. First, the springy disc $d$ is laid on the bottom of the vessel, then the condenser with the other springy disc $g$ is placed upon it. The disc $i$ of insulating material is then placed in position, and pressed so strongly towards the bottom of the vessel that the springy discs $d$ and $g$ are pressed almost flat. Whilst the disc $i$ is pressed down, the casing wall is bent inwards over the outer edge $n$ of the disc $i$ with such an inclination that it serves as an abutment for disc $i$ against the pressure of the spring discs $d$ and $g$. The plastic mass $k$ is then conveyed onto the disc $i$ so held in its position, and then the second insulating disc $m$ is inserted. Whilst the mass $k$ is still soft the casing wall is completely flanged round the disc $m$. At the same time the plastic mass under the pressure of the flanging of the casing wall fills the whole space between the two discs and the wall of the casing and penetrates also into the joints between the lead $o$ and the insulating discs.

The advantage of this sealing lies in that on expansion of the condenser due to heat, the pressure exerted on the disc $i$ is taken up by the wall of the casing, and the plastic mass is held together in a space closed on all sides, and therefore even if it becomes fluid owing to strong heating it cannot escape. The emergence of the casting mass is rendered especially difficult even during greater heating, because the wall of the casing, by the expansion of the insulating discs, presses in a still greater degree on their edges.

We declare, that what we claim is:

1. An electrical condenser comprising a casing open at one end and closed at the other, a condenser body in said casing including a pair of condenser elements and insulating means between said elements, an electrical connection passing through the open end of said casing, a metallic disc in said casing between the open end thereof and said condenser body and freely bearing against said condenser body, one of said condenser elements being electrically connected through said metallic disc to said connection and the other element being electrically connected to said casing, a rigid cap of insulating material positioned inwardly adjacent the open end of said casing, means on the casing engaging the periphery of said cap in a manner clamping the condenser body between the cap and the closed end of the casing, a cover for said casing, plastic sealing material between said cover and cap, and means for securing said cover in position.

2. An electrical condenser comprising a casing open at one end, a pair of condenser elements in said casing, an electrical connection leading from said casing, a flat and rigid cap positioned between said condenser elements and said open end of the casing, inwardly spaced from said open end and snugly fitting the transverse dimensions of said casing in the plane of the cap, means on said casing preventing movement of said cap from its said position toward said open end of the casing, plastic sealing material laid on the outer face of said cap, a rigid cover element positioned on said sealing material wholly within the boundary wall of said casing at its open end and interiorly closing said open end and means securing said cover element in said position within said casing.

3. An electrical condenser comprising a casing open at one end, a pair of condenser elements in said casing, an electrical connection leading from said casing, said casing having its terminal wall portion at said open end transversely flanged inwardly with the free terminal rim edge of the flange defining the opening in said end, a flat and rigid cap positioned in said casing inwardly adjacent to but wholly spaced from said flanged portion of said casing wall and the opening defined by the rim edge thereof, means on said casing cooperating with said cap for preventing movement of said cap from its said position toward said opening, plastic material laid on the outer face of said cap and a rigid cover element on said plastic material and engaging under said flanged portion of said casing wall in position closing said opening.

4. An electrical condenser as defined in claim 3 and in which said cover element is a flat and rigid disc of lesser transverse dimensions than said cap and said plastic material extends over the opposed face of said cover element and about the rim edge thereof.

5. An electrical condenser comprising a casing open at one end, a pair of condenser elements in said casing, an electrical connection leading from said casing, said casing having a circumferential wall portion rearwardly adjacent said open end beveled on an inward inclination toward said open end and a terminal wall portion at said open end transversely flanged inwardly with the free terminal edge of the flange defining the opening in said end, a flat and rigid cap positioned in said casing inwardly adjacent to but wholly spaced from said flanged portion of said casing wall and the opening defined by the rim edge thereof and so bearing against said beveled wall portion of said casing wall as to prevent movement of said cap from its said position toward said opening, plastic material laid on the outer face of said cap and a rigid cover element on said plastic material and engaging under said flanged portion of said casing wall in position closing said opening.

6. An electrical condenser comprising a cylindrical metallic casing open and flanged inwardly at one end and closed at the other end, an insulating lining on the side of the casing, a spring disc in electrical connection with the closed end of said casing, a condenser element in electrical connection with said spring disc, a second condenser element, a second spring disc inwardly adjacent the open end of said casing in electrical connection with said second condenser element, an electrical lead connected to said second spring disc, an insulating disc inwardly spaced from the open end of said casing and bearing against the outer face of said second spring disc, abutment means carried by said casing for preventing movement of said insulating disc toward the open end of said casing, a second insulating disc in said casing spaced outwardly of said first insulating disc and secured in position by the flanged end of said casing, and thermoplastic material in the space between said insulating discs.

7. An electrical condenser comprising a metallic casing having a closed rear end and an opening at the front end, an insulating lining on the side of said casing, a metallic spring disc bearing against the closed end of said casing, a condenser body in said casing forwardly of said spring disc and bearing thereagainst, a second metallic spring disc forwardly of and freely bearing against said condenser body and inwardly spaced from the open end of said casing, a flat and rigid cap of insulating material positioned inwardly adjacent the open end of said casing forwardly of said second spring disc and freely bearing thereagainst, means on said casing engaging the peripheral edge portion of said cap in a manner clamping said condenser body between said cap and the closed end of said casing, a cover closing the opening in the forward end of said casing and plastic sealing material between said cover and cap.

KARL BEER.
GUSTAV PFROMMER.